United States Patent
Meade et al.

(10) Patent No.: US 12,551,225 B2
(45) Date of Patent: Feb. 17, 2026

(54) ERGONOMIC FORCEPS TOOL

(71) Applicant: ALLOSOURCE, Centennial, CO (US)

(72) Inventors: Denis M. Meade, Littleton, CO (US); Shane Graham, Parker, CO (US); Kyle von Kaenel, Thornton, CO (US)

(73) Assignee: Allosource, Centennial, CO (US)

( * ) Notice: Subject to any disclaimer, the term of this patent is extended or adjusted under 35 U.S.C. 154(b) by 617 days.

(21) Appl. No.: 18/112,924

(22) Filed: Feb. 22, 2023

(65) Prior Publication Data

US 2023/0277201 A1 Sep. 7, 2023

Related U.S. Application Data

(62) Division of application No. 15/815,128, filed on Nov. 16, 2017, now abandoned.

(60) Provisional application No. 62/450,640, filed on Jan. 26, 2017.

(51) Int. Cl.
*A61B 17/28* (2006.01)
*A61B 17/88* (2006.01)
*A61B 17/00* (2006.01)

(52) U.S. Cl.
CPC ........ *A61B 17/2816* (2013.01); *A61B 17/282* (2013.01); *A61B 17/2833* (2013.01); *A61B 17/2841* (2013.01); *A61B 17/8866* (2013.01); *A61B 2017/0042* (2013.01); *A61B 2017/0046* (2013.01); *A61B 2017/2837* (2013.01); *A61B 2017/2845* (2013.01)

(58) Field of Classification Search
CPC ................ A61B 17/29; A61B 17/2909; A61B 2017/291; A61B 2017/2918; A61B 2017/00424; A61B 2017/00464; A61B 2017/00477; A61B 17/2816; A61B 17/282; A61B 17/2833; A61B 17/2841; A61B 17/8866; A61B 2017/0042; A61B 2017/0046; A61B 2017/2837; A61B 2017/2845
See application file for complete search history.

(56) References Cited

U.S. PATENT DOCUMENTS

| | | | |
|---|---|---|---|
| 5,120,221 | A | 6/1992 | Orenstein et al. |
| 5,752,960 | A | 5/1998 | Nallakrishnan |
| 2005/0260538 | A1 | 11/2005 | Muller et al. |

(Continued)

*Primary Examiner* — Ashley L Fishback
*Assistant Examiner* — Chima U Igboko
(74) *Attorney, Agent, or Firm* — James A. Sheridan; Sheridan Law, LLC

(57) ABSTRACT

There is disclosed a system and methods for safely and securely gripping osseous-based tissue during allograft processing. One embodiment includes a first forceps half pivotally coupled to a second forceps half, where the first and the second forceps halves combine to form a handle portion and a head portion. The handle portion may define a first longitudinal axis, and the head portion may define a second longitudinal axis that intersects the first longitudinal axis at a varying head angle. The first and the second halves move between an open position in which the first and second forceps halves at the head portion are separated and a closed position in which the first and second forceps halves at the head portion are together. The forceps may also include an open-biasing spring element attached between the first and second forceps halves and a selective locking mechanism. Other embodiments are also disclosed.

13 Claims, 6 Drawing Sheets

(56) References Cited

U.S. PATENT DOCUMENTS

| | | |
|---|---|---|
| 2006/0014115 A1 | 1/2006 | Graham |
| 2006/0079931 A1 | 4/2006 | Brennan |
| 2008/0132940 A1 | 6/2008 | Lavelle et al. |
| 2008/0294192 A1* | 11/2008 | Stefan ................ A61B 17/1608 606/205 |
| 2009/0151522 A1 | 6/2009 | Storm et al. |
| 2009/0248063 A1 | 10/2009 | Wotton, III |
| 2010/0114154 A1 | 5/2010 | Snell |
| 2011/0152953 A1 | 6/2011 | Link |
| 2012/0253364 A1* | 10/2012 | Perin ................... A61B 17/062 606/1 |
| 2013/0040259 A1 | 2/2013 | Goodman |
| 2013/0081975 A1* | 4/2013 | Lincoln .................... B25B 7/02 294/92 |
| 2014/0236194 A1 | 8/2014 | Deutsch et al. |
| 2015/0305762 A1* | 10/2015 | Dunn .................... A61B 17/30 606/205 |
| 2018/0042591 A1* | 2/2018 | Russo .................. A61B 17/064 |
| 2018/0221043 A1 | 8/2018 | Deister et al. |

* cited by examiner

ERGONOMIC FORCEPS TOOL

REFERENCE TO PRIOR PATENT APPLICATION

This application is a divisional of U.S. patent application Ser. No. 15/815,128, filed Nov. 16, 2017 by Denis M. Meade, Shane Graham, and Kyle von Kaenel, for ERGONOMIC FORCEPS TOOL, which claims the benefit under 35 U.S.C. 119 (e) of U.S. Provisional Patent Application No. 62/450,640, filed Jan. 26, 2017 by Denis M. Meade, Shane Graham, and Kyle von Kaenel for "ERGONOMIC FORCEPS TOOL" all of which patent applications are is hereby incorporated herein by reference.

BACKGROUND

An allograft includes bone, tendon, skin, or other types of tissue that is transplanted from one person to another. Allografts are used in a variety of medical treatments, such as knee replacements, bone grafts, spinal fusions, eye surgery, and skin grafts for the severely burned. Allografts come from voluntarily donated human tissue obtained from cadaveric donor-derived, living-related, or living-unrelated donors and can help patients regain mobility, restore function, enjoy a better quality of life, and even save lives in the case of cardiovascular tissue or skin.

Processing operations for osseous-based allografts often require a technician to grip an upper end of a human cadaveric femur, or a femoral head, while exposing the femoral head to a cutting or rotating edge (e.g., a band saw blade, drill press, etc.) for the purpose of removing the hard outer layer of cortical bone to expose the softer cancellous bone required for an osseous-tissue donation beneath.

Existing hand tools used to prepare and process osseous-based allografts are not designed to safely grip the non-uniform, asymmetrical contour of human femoral heads and lack a configuration that allows users of varying builds, sizes and strengths to adequately grasp, grip, and manipulate osseous tissue. Moreover, existing tools align the user's hand with the osseous tissue being gripped, putting the user's hand and fingers in the direct path of the cutting edge or abrasive surface and risking traumatic injury.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

One embodiment provides an ergonomic forceps tool for gripping osseous-based tissue during allograft processing. The ergonomic forceps tool may include a first forceps half pivotally coupled to a second forceps half, the first and the second forceps halves combining to form a handle portion and a head portion, the handle portion defining a first longitudinal axis and the head portion defining a second longitudinal axis that intersects the first longitudinal axis at a head angle, wherein the first and the second halves move between an open position in which the first and the second forceps halves at the head portion are separated and a closed position in which the first and the second forceps halves at the head portion are together. The ergonomic forceps tool may also include a spring element attached between the first and the second forceps halves, the spring element biased toward the open position.

Another embodiment provides an ergonomic forceps tool kit for securing osseous-based tissue for processing operations. The kit may include (1) a number of forceps, each of the forceps comprising: (a) first and second pivotally coupled forceps halves, the first and the second forceps halves combining to form a handle portion and a head portion, the head portion comprising first and second opposing jaws configured to move between open and closed positions, wherein: (i) the handle portion comprises a proximal end and a distal end and defines a first longitudinal axis and the head portion comprises a proximal end and a distal end and defines a second longitudinal axis that intersects the first longitudinal axis at a head angle; (ii) the head angle defines an offset between the first longitudinal axis and the distal end of the head portion; and (iii) the head angle and the offset vary for each of the number of the forceps. The kit may also include a number of interchangeable grips, each of the interchangeable grips comprising a finger portion and a thumb portion, the finger and the thumb portions sized to fit a particular hand size, wherein each of the interchangeable grips is configured for removable installation upon the handle portion of any one of the number of the forceps.

Yet another embodiment provides a method of preparing an allograft from osseous-based tissue using an ergonomic forceps tool kit. The kit may include (1) a number of ergonomic forceps, each having a handle portion defining a first longitudinal axis and a head portion having opposing first and second jaws that define a second longitudinal axis that intersects the first longitudinal axis at a head angle, wherein the head angle of each of the ergonomic forceps is different; and (2) a number of interchangeable grips, each adapted for removable installation upon the handle portions of the number of the ergonomic forceps, wherein each of the interchangeable grips is configured to fit a different hand size. The method may include the steps of (a) based upon a correlation between a configuration of the osseous-based tissue and the head angle of each of the ergonomic forceps, selecting one of the number of the ergonomic forceps; (b) based upon a hand size of a user, selecting one of the number of the interchangeable grips; (c) removably installing the selected one of the number of the interchangeable grips upon the handle portion of the selected one of the number of the ergonomic forceps; and (d) compressing the handle portion of the selected one of the number of the ergonomic forceps to move the head portion from an open position in which the first and the second jaws a separated by a jaw opening width to a closed position in which the first and the second jaws are secured about the osseous-based tissue.

Other embodiments are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Various embodiments of the systems and methods described herein relate to the safe, efficient, and effective processing of osseous-based allografts using an ergonomic, adjustable-grip forceps tool. As discussed above in the Background section, existing hand tools are not designed with an eye toward the manipulation of human femoral heads and present several utility and safety challenges. First, existing tools lack a suitable jaw opening distance, appropriately-sized teeth, and an ergonomic design necessary to grip non-uniform and asymmetrical osseous tissue securely and without causing tissue damage. The lack of an ergonomic design in existing tools requires the operator to exert a constant grip pressure, which can lead to musculoskeletal injuries or disorders caused when the operator manually compensates for the tool's failings. In addition, existing tools generally feature a straight design in which the head of the forceps tool is aligned with its handles. During operation, the user's hand is positioned directly in line with the material being held, and, as a result, the user's hand is directly in line with any applicable cutting edge, rotating edge, or abrasive surface, risking traumatic injuries caused by operator contact with the cutting/rotating edge or abrasive surface. Existing tools are also universally sized, rendering them unwieldy for small hands and/or operators with weak grip strengths.

Embodiments of the ergonomic forceps tool disclosed herein are designed to address the particular challenges presented in the osseous-based allograft industry, with improved grip functionality that also allows the user to avoid the path of the blade, rotating edge, or abrasive surface to avoid traumatic injuries when preparing osseous-based allografts. Embodiments of the ergonomic forceps tool discussed below also provide a variety of interchangeable grips to better fit each user's hand and assist the user in exerting a constant grip pressure when the tool is in use to decrease the risk for musculoskeletal-related injuries.

Figures 1A, 1B:
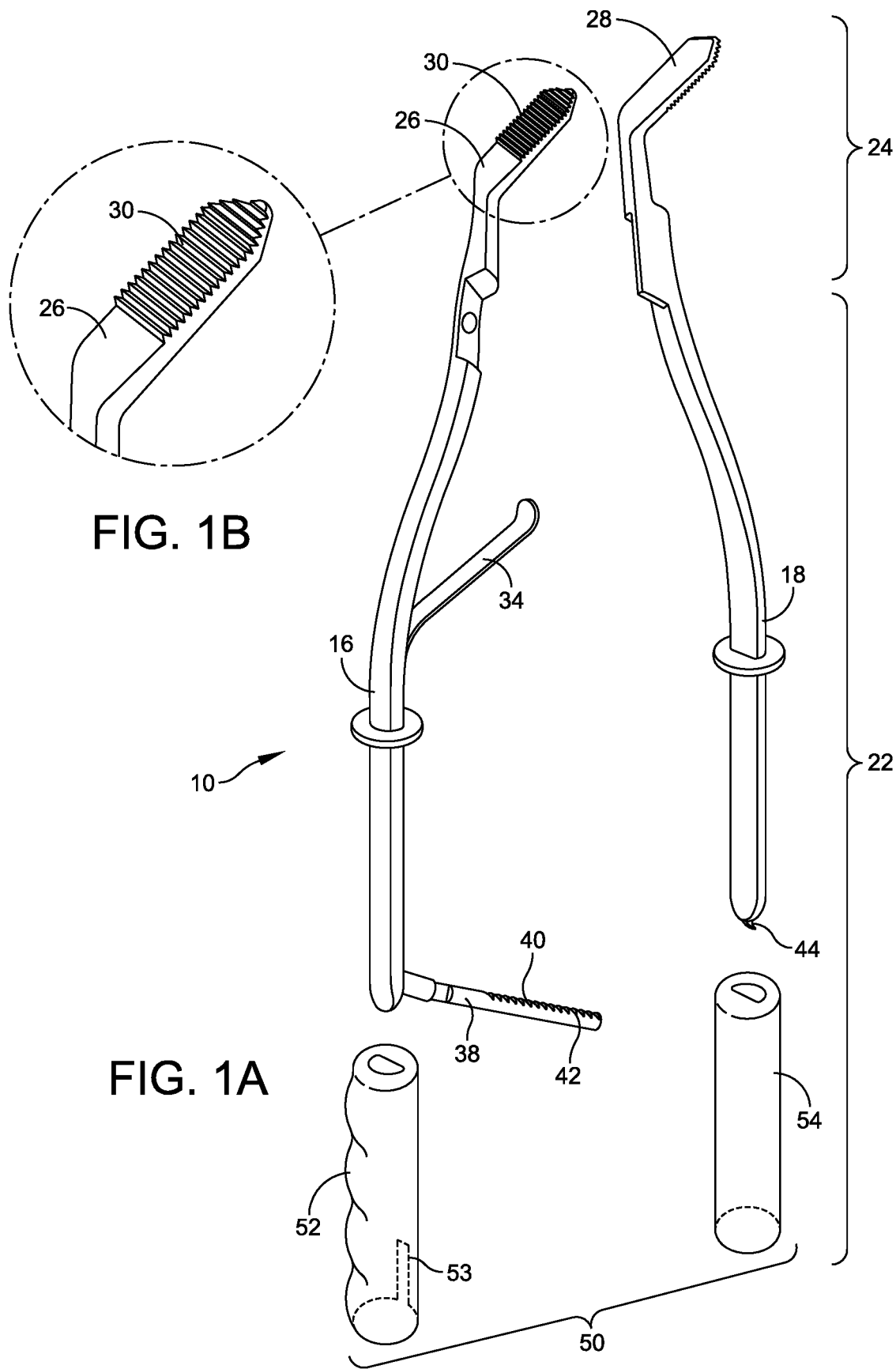
FIG. 1A illustrates an exploded view of one embodiment of an ergonomic forceps tool for securely gripping osseous-based tissue during the performance of processing operations on the tissue.
FIG. 1B illustrates a detail view of a first jaw of the ergonomic forceps tool of FIG. 1.
Figure 2:
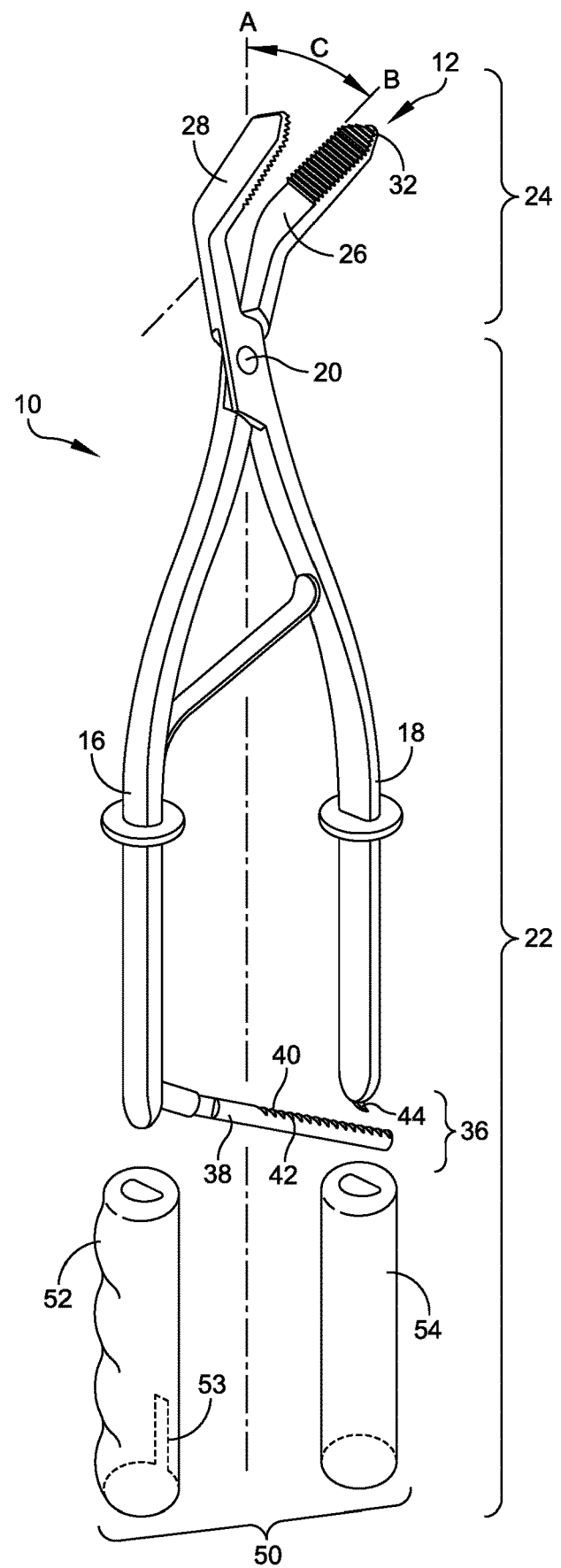
FIG. 2 illustrates a perspective view of the ergonomic forceps tool of FIG. 1 in an open position.
Figure 3:
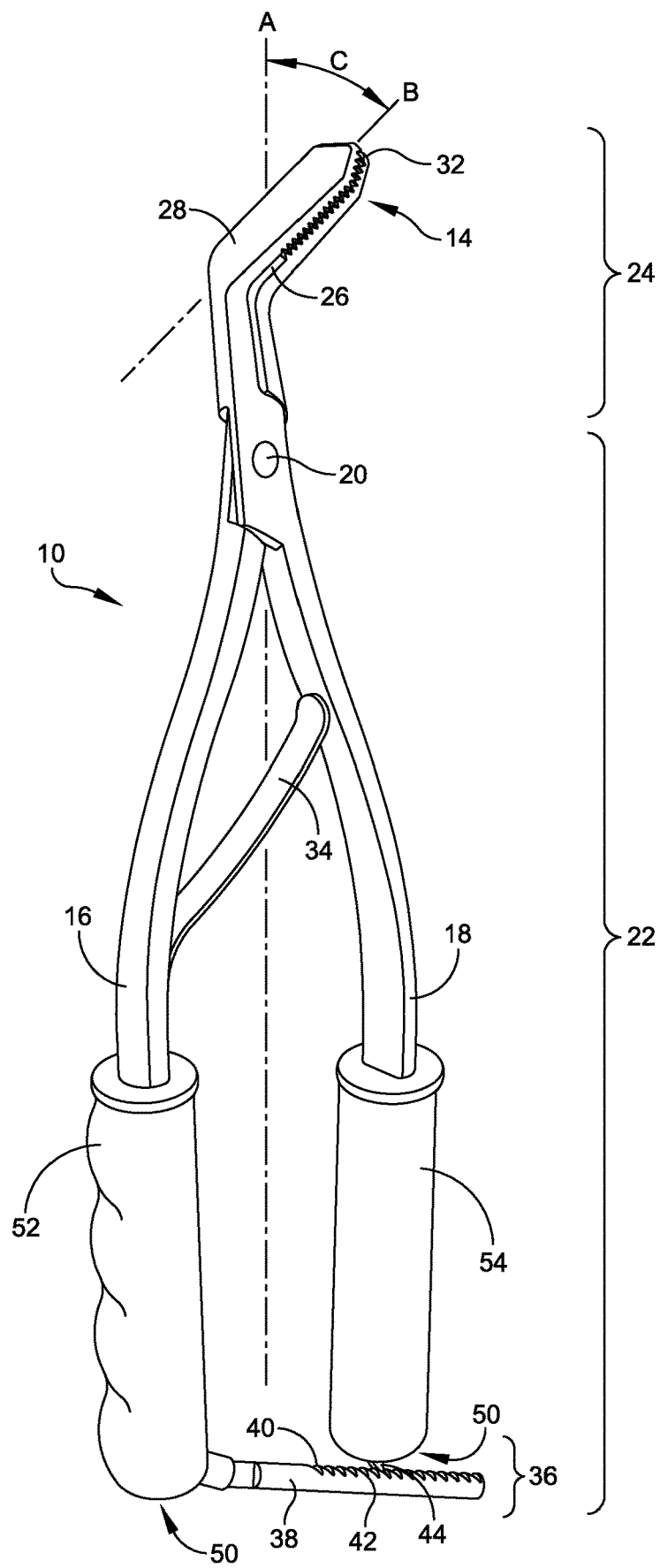
FIG. 3 illustrates a perspective view of the ergonomic forceps tool of FIG. 1 in a closed position.

FIG. 1A illustrates an exploded perspective view of one embodiment of an ergonomic forceps tool 10 for use in preparing osseous-based allografts. FIGS. 2-3 illustrate perspective views of the ergonomic forceps tool 10 in an open position 12 and a closed position 14, respectively. In this embodiment, the ergonomic forceps tool 10 may include a first forceps half 16 that is pivotally coupled with a second forceps half 18 via any appropriate pivoting connector 20 such as, for example, a central pin. The pivoting connector 20 may separate a handle portion 22 of the tool 10, which is configured for manual operation via a user's hand (e.g., handle compression), and a head portion 24 of the tool 10, which may feature opposing first and second jaws 26, 28 configured to move between the open position 12, in which the jaws 26, 28 are spread apart by a jaw opening width (FIG. 2), and the closed position 14, in which the jaws are compressed together (FIG. 3) or secured or gripped about an element of osseous-based tissue such as a human femoral head. The first and the second jaws 26, 28 may each include a number or rows of inwardly-extending teeth 30, detailed in FIG. 1B. The teeth 30 may be configured in any appropriate manner or arrangement, including any appropriate teeth length(s) and/or spacing between teeth 30 to achieve optimal gripping and manipulation of osseous-based tissue. In one embodiment, each tooth may have a length of approximately 3 mm.

Figure 4:
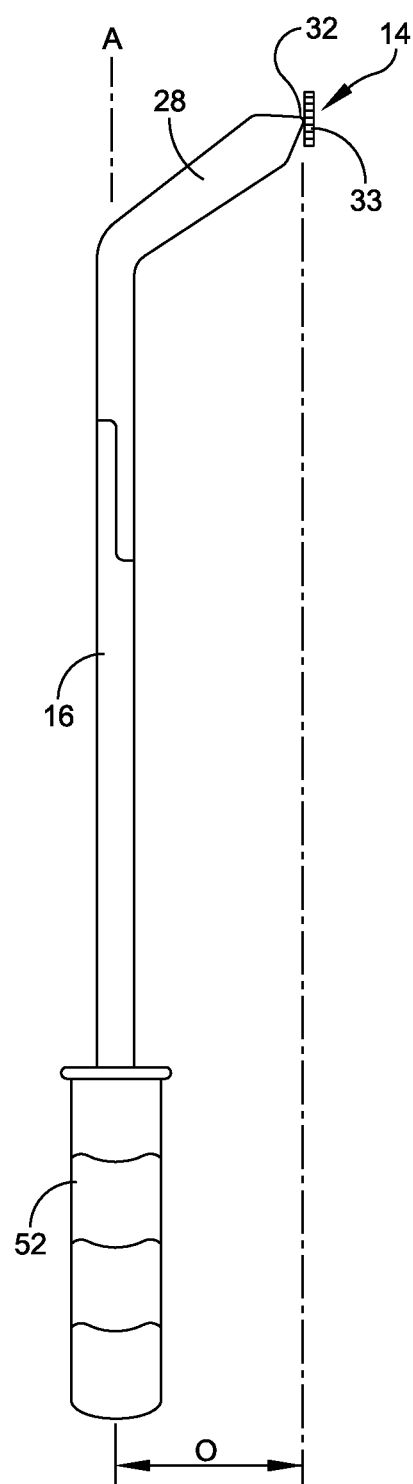
FIG. 4 illustrates a top plan view of the ergonomic forceps tool of FIG. 1 positioned adjacent to a cutting blade.

As shown in FIGS. 2-3, the handle portion 22 of the tool 10 may define a first longitudinal axis A, while the first and the second jaws 26, 28 of the head portion 24 may define a second longitudinal axis B that intersects the first longitudinal axis at a head angle C. Varying embodiments of the tool 10 may feature differing head angles C ranging from 30 to 90 degrees. This configuration, in which the jaws 26, 28 of the head portion 24 are angled away from the handle portion 22 as further detailed in the side view of FIG. 4, results in an offset O that separates a distal end 32 of the head portion 24 (i.e., where the head portion 24 meets a blade edge or abrasive surface 33 during processing operations) from the longitudinal axis A of the handle portion 24 and a user's hand (not shown) during allograft preparation, thereby providing a safer use model that avoids probable contact with the cutting edge or abrasive surface in the event the user slips or jerks toward the blade or abrasive surface.

A spring element 34 may extend between the first and the second forceps halves 16, 18. The spring element 34 may be biased toward the open position 12 of the head portion 24 (FIG. 2) and may provide an automatic counterforce resisting the user's compression of the first and the second forceps halves 16, 18 of the handle portion 22 toward the closed position 14 of the jaws 26, 28 (FIG. 3). In one embodiment, the spring element 34 may be formed of one or more spring steels extending between the first forceps half 16 and the second forceps half 18. The spring steels may be attached to the forceps halves 16, 18 in any appropriate manner (e.g., screws or other fasteners, precision welding, etc.).

To assist the user in exerting a constant grip or compression pressure against the osseous tissue gripped within the first and the second jaws 26, 28 of the head portion 24, the forceps tool 10 may also include a selective locking mechanism 36. In this embodiment, the selective locking mechanism 36 may include a pivoting ratchet-based locking bar 38 located at a distal end of the handle portion 22. The ratchet-based locking bar 38 may be rotatively coupled with the first forceps half 16 via a pin or other appropriate rotative fastener and may include a number of teeth or ridges 40 that form a number of grooves 42 therebetween, where each of the grooves 42 is configured to receive or engage with a protrusion or pawl 44 protruding from a distal end of the second forceps half 18.

Together, the spring element 34 and the selective locking mechanism 36 may assist the user in exerting a constant compression force or grip pressure upon the handle portion 22, thereby maintaining the jaws 26, 28 of the head portion 24 in the closed, engaged position 14 about the osseous tissue being gripped with a desired, constant amount of grip pressure. Rather than maintaining the pressure manually throughout an allograft preparation procedure, the user may selectively engage the pawl 44 of the locking mechanism 36 with the appropriate ratchet groove 42 to maintain the desired compression force. Once the selective locking mechanism 36 is released, the counterforce spring element 34 may naturally expel the forceps halves 16, 18, and thus the jaws 26, 28, into the open position 12, thereby reducing the risk of musculoskeletal-related repetitive motion injuries to the user.

While the selective locking mechanism 36 is described with a particular teeth/groove and pawl structure between the ratchet-based locking bar 38 and the pawl 44, it should be understood that embodiments of the selective locking mechanism 36 may take any appropriate structure or configuration. The ratchet-and-pawl mechanism discussed above is simply one exemplary mechanism for maintaining the forceps halves 16, 18 in the compressed position.

The ergonomic forceps tool 10 may also include one or more pairs of removable and interchangeable grips 50, each having a finger portion 52 adapted to envelop the first forceps half 16 and a thumb portion 54 adapted to envelop the second forceps half 18. Both of the finger portion 52 and the thumb portion 54 may be adapted for slidable installation upon and removal from the first and the second forceps halves 16, 18, respectively. In one embodiment, one or both of the grip portions 52, 54 may include an access cutout 53 to accommodate features of the selective locking mechanism 36 of the handle portion 22. Because each user has a unique hand size, the grip 50 may be customized for the user's hand. In one embodiment, discussed below in relation to FIG. 5, a number of grips 50 may be provided such that the user may select a pair of grips 50 that best fits his or her hand.

Figure 5:
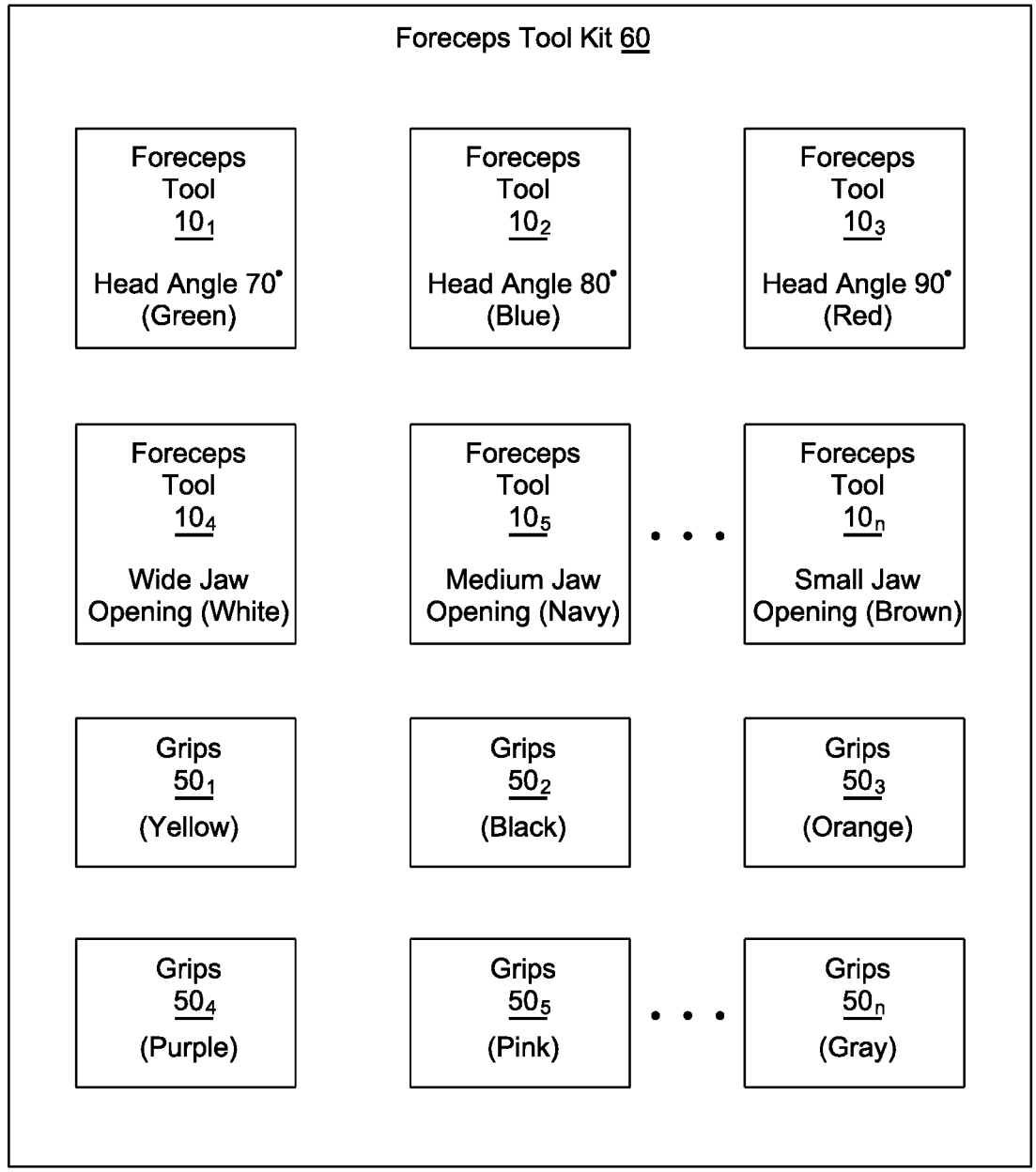
FIG. 5 provides a schematic depicting one embodiment of an ergonomic forceps tool kit.

FIG. 5 provides a block diagram depicting one embodiment of a forceps tool kit 60. In this embodiment, the kit 60 may include a number of forceps tools $10_{1-n}$, each having a different head angle (e.g., 70°, 80°, 90°) and a number of pairs of grips $50_{1-n}$, each pair configured to accommodate a different hand size. In use, the user may select the most appropriate forceps tool $10_{1-n}$ based on a particular configuration of the osseous-based tissue to be gripped, as well as the various angular cuts to be made to the tissue during allograft processing. Embodiments of the kit 60 may also include forceps $10_{1-n}$ having different teeth sizes and/or spacing, various jaw opening widths, and/or various handle portion lengths and/or widths, as appropriate.

Once the appropriate forceps tool $10_{1-n}$ has been selected, the user may select an appropriate pair of grips $50_{1-n}$ (or combination of finger grip 52 and thumb grip 54 portions) and manually install the selected grips $50_{1-n}$ upon the handle portion 22 of the selected forceps tool $10_{1-n}$ before gripping the osseous tissue and beginning the allograft preparation process. To streamline the selection process, both the tools $10_{1-n}$ and/or the grips $50_{1-n}$ may be color coded, numbered, or otherwise identified such that users learn to identify certain colors with certain applications or with certain colors as representing their "sizes" or preferences.

Figure 6:
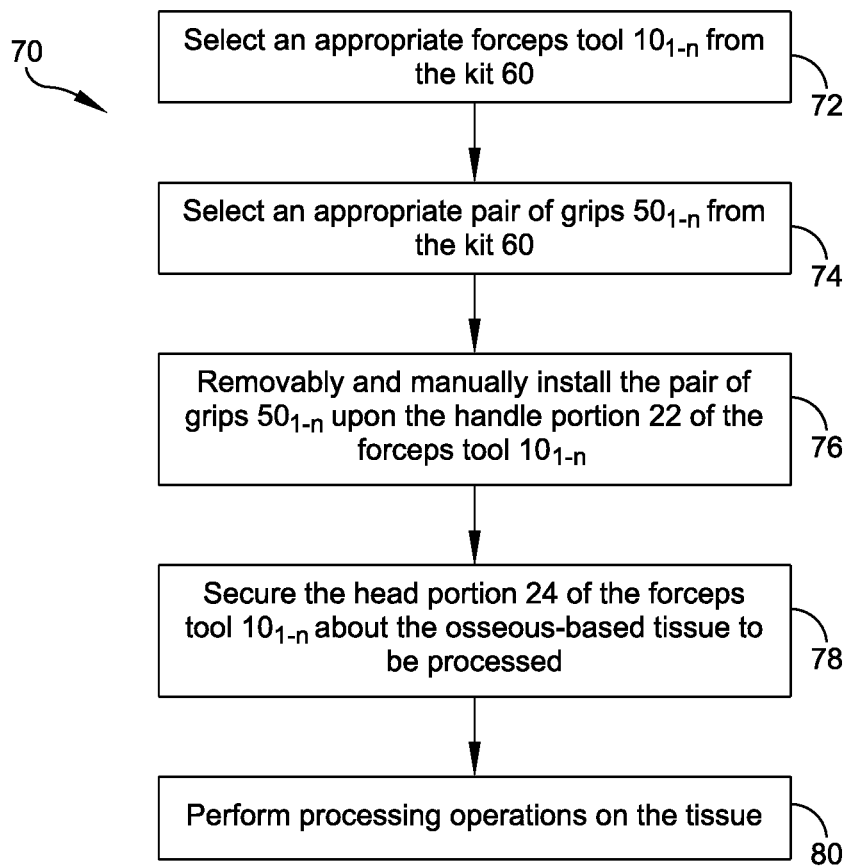
FIG. 6 provides a flowchart depicting an exemplary method of performing allograft processing operations using the ergonomic forceps tool kit of FIG. 5.

FIG. 6 provides a flowchart depicting an exemplary method (70) of preparing an allograft employing the forceps tool kit 60. To begin, the user may select an appropriate forceps tool $10_{1-n}$ (72) for the current gripping/allograft preparation application (e.g., appropriate head angle, jaw opening width, and/or teeth size and/or spacing) and select an appropriate pair of grips $50_{1-n}$ (74) comprising a desired combination of finger grip 52 and thumb grip 54 portions. Then the user may manually and removably install the selected pair of grips $50_{1-n}$ upon the selected ergonomic forceps tool $10_{1-n}$ (76) before using the forceps tool $10_{1-n}$ to secure the first and the second jaws 26, 28 of the head portion 24 of the forceps tool $10_{1-n}$ about the target osseous-based tissue (e.g., femoral head) (78) before performing processing operations (80) in a safe and effective manner in which the user's hand is offset from the blade or abrasive surface 33 used in processing operations.

Embodiments of the ergonomic forceps tool may be constructed of surgical stainless steel using a minimum number of parts to facilitate use, autoclave cleaning, maintenance, and repairs. Alternatively, the forceps tool may be formed of autoclavable plastics such as high-impact polyvinyl chloride (PVC), polypropylene (PP), polysulfone (PS), polyetheretherketone (PEEK), polymethylpentene (PMP), polycarbonate (PC), PTFE Resin, and polymethyl methacrylate (PMMA). Other embodiments may be formed of disposable plastics.

While the above discussion relates to using the forceps tool for the purpose of gripping osseous tissue during the preparation of osseous-based allografts, and the tool is ideally designed for use within human tissue banks in connection with human femoral heads, the tool is also suitable for and may be used to grip other osseous tissues and/or other non-uniform or unevenly-sized materials such as, for example, wooden dowels, plastic or metal piping, rock, and so on, as part of other manufacturing processes that would benefit from secure gripping and protection of the user's hands during processing.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:
1. A method of preparing an allograft from osseous-based tissue using an ergonomic forceps tool kit, the kit comprising:
  a number of ergonomic forceps, each having a handle portion defining a first longitudinal axis and a head portion having opposing first and second jaws that define a second longitudinal axis that intersects the first longitudinal axis at a head angle, wherein the head angle of each of the ergonomic forceps is different; and
  a number of interchangeable grips, each adapted for removable installation upon the handle portions of the number of the ergonomic forceps, wherein each of the interchangeable grips is configured to fit a different hand size, the method comprising:
    based upon a correlation between a configuration of the osseous-based tissue and the head angle of each of the ergonomic forceps, selecting one of the number of the ergonomic forceps;
    based upon a hand size of a user, selecting one of the number of the interchangeable grips;

removably installing the selected one of the number of the interchangeable grips upon the handle portion of the selected one of the number of the ergonomic forceps; and compressing the handle portion of the selected one of the number of the ergonomic forceps to move the head portion from an open position in which the first and the second jaws a separated by a jaw opening width to a closed position in which the first and the second jaws are secured about the osseous-based tissue.

2. The method of claim 1, wherein the osseous-based tissue comprises a human femoral head.

3. The method of claim 1, wherein:
the first and the second jaws of the head portion of each of the ergonomic forceps comprise inwardly-extending teeth of a different length; and
the open position of the first and the second jaws of the head portion of each of the ergonomic forces comprises a different jaw opening width.

4. The method of claim 1, further comprising engaging a selective locking mechanism to maintain the first and the second jaws of the selected one of the number of the ergonomic forceps in the closed position.

5. The method of claim 1, wherein the head angle is between 30 and 90 degrees.

6. The method of claim 1, further comprising disposing the head portion about a human femoral head.

7. The method of claim 1, further comprising a spring element configured to bias the first and second jaws toward the open position.

8. The method of claim 7, wherein the spring element includes at least one counterforce spring steel biased toward the open position.

9. The method of claim 7, further comprising applying a counterforce to close the first and second jaws to the closed position in which the first and the second jaws are secured about the osseous-based tissue.

10. The method of claim 1, further comprising a selective locking mechanism configured to secure the head portion in a desired compressed position between the closed position and the open position such that the head portion applies a desired compressive force to a tissue portion secured between the first and the second jaws.

11. The method of claim 10, further comprising locking the selective locking mechanism to secure the head portion in the desired compressed position between the closed position and the open position such that the head portion applies the desired compressive force to the tissue portion secured between the first and the second jaws.

12. The ergonomic forceps tool kit of claim 10, wherein the selective locking mechanism comprises a ratchet-and-pawl mechanism.

13. The method of claim 10, further comprising locking the ratchet-and-pawl mechanism to secure the head portion in the desired compressed position between the closed position and the open position such that the head portion applies the desired compressive force to the tissue portion secured between the first and the second jaws.

* * * * *